United States Patent [19]

Martin

[11] 4,048,915
[45] Sept. 20, 1977

[54] METHOD AND APPARATUS FOR DENESTING CARTONS

[75] Inventor: Thomas R. Martin, Milwaukee, Wis.

[73] Assignee: Condes Corporation, Milwaukee, Wis.

[21] Appl. No.: 674,541

[22] Filed: Apr. 7, 1976

[51] Int. Cl.² .................. B65H 3/28; B65G 59/10
[52] U.S. Cl. .................. 101/35; 214/8.5 H; 221/1; 221/222
[58] Field of Search ............ 221/222, 221, 297, 277, 221/289, 1; 214/8.5 H, 8.5 K, 8.5 R, 152; 101/35, 36, 37

[56] References Cited

U.S. PATENT DOCUMENTS

| | | | |
|---|---|---|---|
| 3,195,451 | 7/1965 | Hovekamp et al. | 101/38 R |
| 3,323,680 | 6/1967 | Beer | 221/221 |
| 3,426,941 | 2/1969 | Hovekamp | 221/222 |
| 3,741,410 | 6/1973 | Henschke | 221/222 X |
| 3,862,702 | 1/1975 | Johnson et al. | 221/222 X |
| 3,895,574 | 7/1975 | Nyborg | 101/37 |
| 3,980,204 | 9/1976 | DuBroff et al. | 221/222 |

*Primary Examiner*—Clifford D. Crowder
*Attorney, Agent, or Firm*—James E. Nilles

[57] ABSTRACT

A method and apparatus for denesting cartons including a carton denester for receiving a stack of cartons, such as pulp egg cartons, and for separating the cartons so that they can be conveyed to carton handling apparatus. The carton denester includes a relief plate which is supported at an inclined relationship and which receives a stack of cartons against its inclined surface. The carton denester further includes a feed screw assembly connected to the lower end of the relief plate and generally perpendicular to it to support the bottom of the stack of cartons. The feed screw assembly includes a pair of rotatable feed screws which are received on opposite sides of the stack of cartons and which include helical grooves to receive the flanges of the bottom carton of the stack and to cause the bottom carton to be pulled away from the remainder of the stack upon rotation of the feed screws. The feed screws are positioned generally below the lower edge of the relief plate and such that the cartons move past the end of the relief plate before they are received in the helical grooves of the feed screws. As the bottom carton moves past the end of the relief plate, its weight is no longer supported by the relief plate and it tends to snap free of the remainder of the stack of cartons still supported by the relief plate. The feed screws can then easily pull the bottom carton downwardly away from the remainder of the stack.

7 Claims, 8 Drawing Figures

METHOD AND APPARATUS FOR DENESTING CARTONS

BACKGROUND OF THE INVENTION

The present invention relates to a method and apparatus for separating stacked cartons and including carton denesters which receive stacks of pulp cartons such as egg cartons and which provide means for separating the bottom carton from the stack to permit it to be conveyed to a subsequent processing mechanism.

A variety of types of machines such as those used to apply printing to egg cartons are capable of handling individual cartons at high rates of speed, often in excess of 200 cartons per minute. Generally, pulp egg cartons fed to such machines are tightly stacked in an open position and in large numbers. These stacks are fed to the printing machine and must be separated by a carton denesting apparatus in order that successive cartons may be delivered individually into the carton handling means. Particular difficulties are encountered in the denesting of stacks of pulp egg cartons because of the relatively rough surfaces of such cartons and because when the cartons are stacked, they present a substantial number of opposed surfaces. The denesting operation is thus retarded because it is difficult to pull these adjacent cartons apart due to the large areas which are in sliding contact and due to the high co-efficient of friction between these surface areas due to the relatively rough pulp surfaces. The stacked pulp cartons are sometimes also subject to an expansion or contraction during storage as a result of exposure to either excess moisture or excessively dry air. Such expansion or contraction of the cartons causes the cartons comprising a stack to become even more firmly wedged together making them even more difficult to pull apart during a denesting operation.

As a result of these inherent qualities of pulp egg cartons, the prior art denesting means have failed to provide an efficient and consistent means capable of separating and feeding cartons at speeds commensurate with the efficient operating speeds of the commercially available carton handling machines such as carton printing equipment.

SUMMARY OF THE INVENTION

The present invention provides a method and apparatus for denesting cartons and includes an improved carton desester having a simplified, faster and more efficient means of separating cartons. Generally, the carton denester of the invention provides a means for receiving a stack of pulp cartons positioned in tightly nested relationship and for rapidly pulling the bottom carton downwardly away from the remainder of the stack and thus separating it from the stack to permit its delivery to a subsequent handling station.

More specifically, the carton denester includes a relief plate which is supported at an angle of approximately 25° relative to a vertical position and which provides an inclined flat surface for receiving a stack of nested cartons. The lower end of the relief plate in turn supports a pair of spaced parallel feed screw supporting arms which extend perpendicular to the relief plate so as to be inclined at an angle of approximately 25° from a horizontal position. The feed screw supporting arms each support a feed screw having a spiral groove therein for receiving a peripheral edge of the bottom carton of a stack of cartons and for providing a means for pulling the bottom carton away from the remainder of the stack. The relief plate and the feed screw supporting arms are arranged in such a manner that as the bottom cartons of the stack are consecutively pulled away from the stack, the carton assuming the position of the bottom carton slides past the end of the relief plate before it is received within the helical grooves of the feed screws. As the bottom carton moves past the end of the relief plate, the weight of the carton is no longer supported by the relief plate and it tends to snap free of the remainder of the stack of cartons still supported by the relief plate. The feed screws can then easily pull the bottom carton downwardly away from the remainder of the stack.

In order to provide further means for effecting release of the bottom carton, the feed screws are driven such that they rotate in the same direction and apply opposite forces on the sides of the cartons. These forces create a twisting effect on the stack of cartons and particularly upon the bottom carton engaged by the feed screws. The twisting forces upon each of the cartons, except for the bottom carton, are resisted by the relief plate, thus causing differing forces to be applied to the bottom carton and to the remainder of the stack. These differences in the relative forces acting upon the bottom carton and the remainder of the cartons in the stack further facilitate the tendency of the bottom carton to snap free of the carton above.

The effect of the construction of the carton denester of the present invention results in a means for separating and feeding the egg cartons at consistent speeds in excess of 200 cartons per minute. As previously stated, heretofore it has not been possible to deliver egg cartons to a printing machine or the like at such speeds.

Additional advantages of the invention are described in more detail in the drawings and in the following description of a preferred embodiment.

DESCRIPTION OF THE PREFERRED EMBODIMENT

Figure 1:
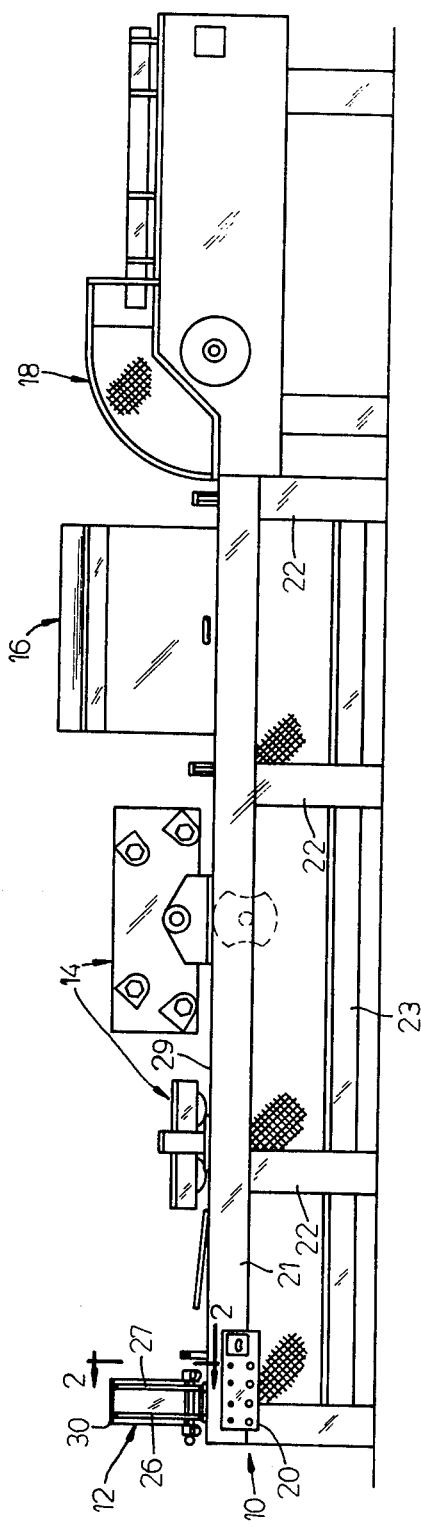
FIG. 1 is a side elevation view of an egg carton printing apparatus incorporating the carton denester of the present invention.

The carton denester of the present invention is shown in FIG. 1 for purposes of example as being attached to a carton printing apparatus comprised of a plurality of carton handling stations spaced along a generally horizontally extending conveyor assembly 10. The conveyor assembly 10 includes a means for propelling containers in a left to right direction as viewed in FIG. 1 and past each of the various container handling stations spaced along the conveyor assembly 10. These container handling stations include the carton denester assembly 12 of the present invention, a printing assembly 14, a drying assembly 16, and a re-stacking assembly 18.

Generally, in operation, the carton denester assembly 12 is designed to support a stack of opened downwardly facing containers C which comprise, for example, pulp egg cartons. The carton denester assembly 12 is intended to separate successive bottom cartons from the stack and to feed these bottom cartons consecutively to the conveyor assembly 10 such that they can be conveyed in a downwardly opened and unfolded position to the printing assembly 14.

The conveyor assembly 10 is comprised of a generally horizontally extending frame 21 supported by a plurality of vertical legs 22 and braces 23. The frame 21 supports a driven horizontally extending endless conveying chain 24 which supports spaced brackets 25 for propelling individual cartons to the container handling stations at speed on the order of 200 to 400 cartons per minute. The speed of the conveying means and each of the operating stations is regulated by a control panel 20.

The carton denester assembly 12 is shown in greater detail in FIGS. 2-5 and includes a pair of spaced-apart generally parallel angular brackets 26 and 27 which each have a horizontally extending base portion 28 bolted to a conveyor table 29 of the frame 21. The angular brackets 26 and 27 function to support a relief plate 30 at an angle of approximately 25° with respect to the vertical. The relief plate 30 is supported by a pair of vertically spaced, horizontally extending backing plates 31 and 32 rigidly connected to the relief plate 30 and slideably adjustably supported by the angular brackets 26 and 27. The relief plate is thus relatively slideable with respect to the angular brackets in order to permit minor adjustment of its vertical position with respect to the conveyor table 29.

Figure 2:
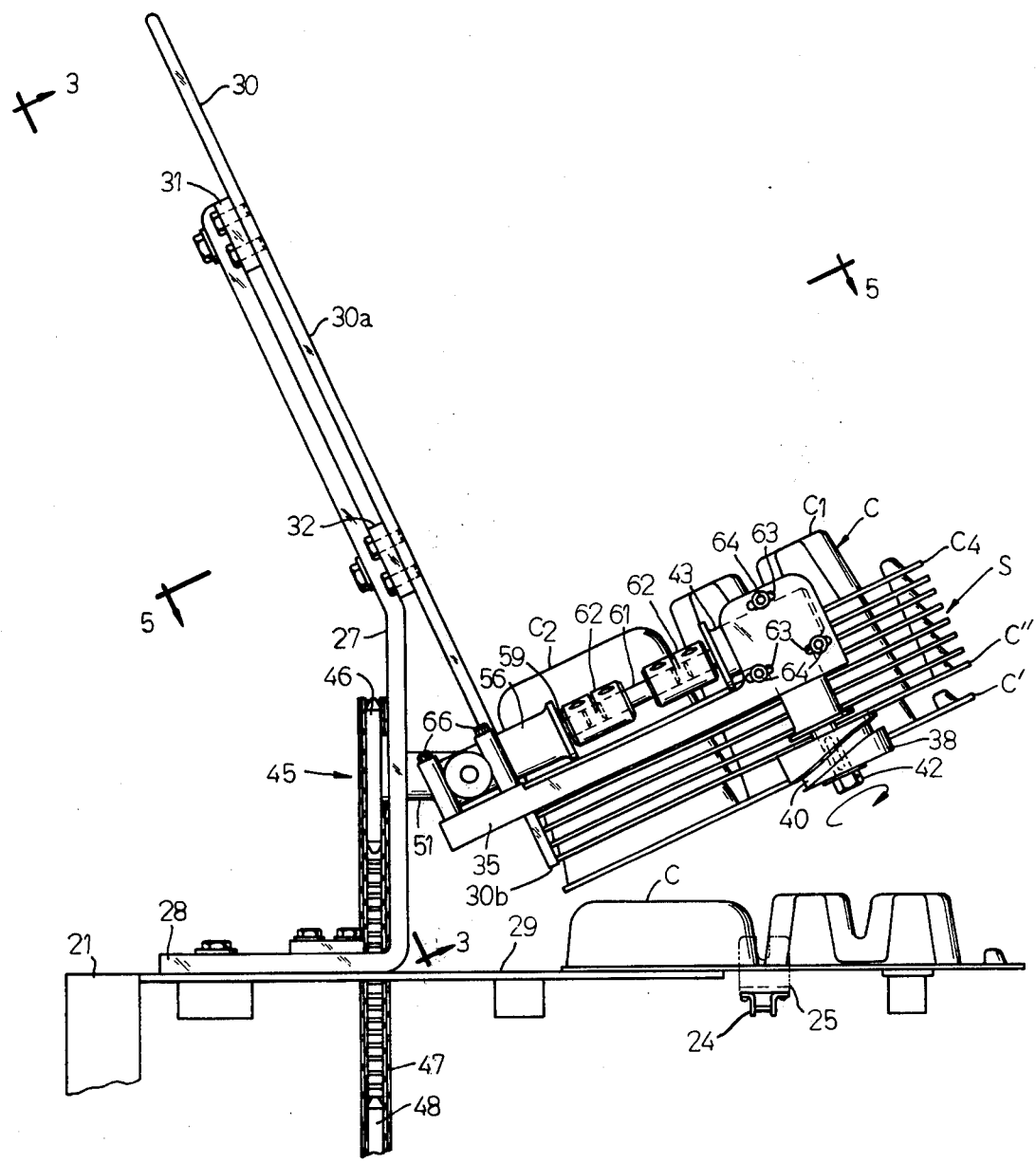
FIG. 2 is an enlarged view of the carton denester and taken along the line 2—2 in FIG. 1.
Figure 3:
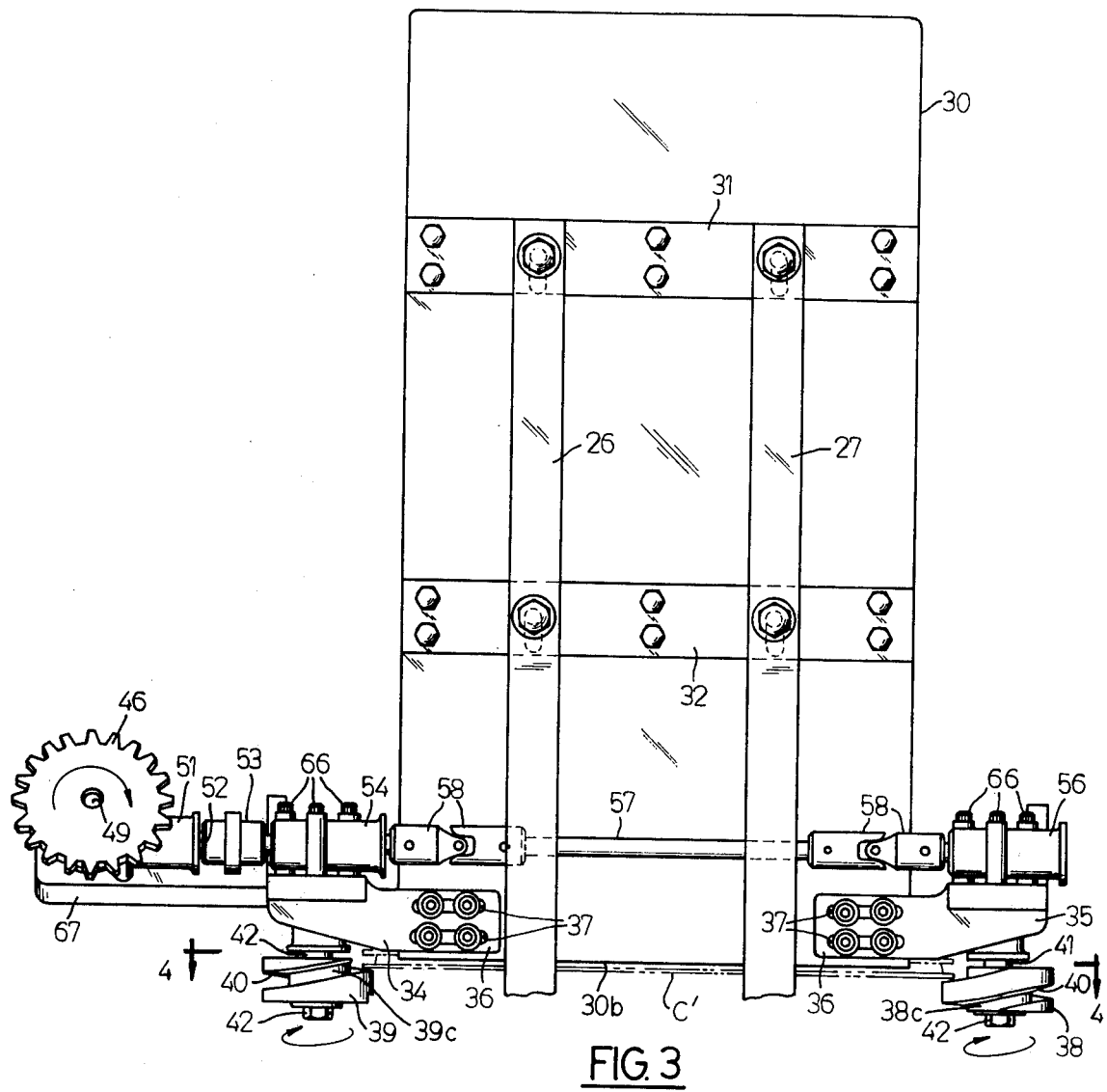
FIG. 3 is a view taken along the line 3—3 in FIG. 2.

The opposite sides of the lower end of the relief plate 30 each support angular feed screw supporting brackets 34 and 35. Each of these angular brackets includes a plate portion 36 containing a pair of generally horizontal vertically spaced slots 37 (FIG. 3), each of these slots designed to receive a pair of bolts to permit the angular feed screw supporting brackets 34 and 35 to be adjustably but rigidly secured to the lower end of the relief plate 30. As shown in FIG. 2, each of the feed screw supporting brackets extend generally perpendicular to the relief plate 30 and thus define an angle of approximately 25° with respect to the horizontal. The outwardly extending ends of the feed screw supporting brackets each function to support rotatable feed screws 38 and 39.

The feed screws 38 and 39 each comprise a cylindrical or generally disc-shaped member including a helical groove 40 around its periphery and are rotatably supported by shafts 41 and 42, respectively. The feed screws 38 and 39 are comprised of a material such as nylon, for example, which has a low co-efficient of friction and which has desirable wear qualities. Of course, other suitable materials could be used in place of that described.

Figure 5:
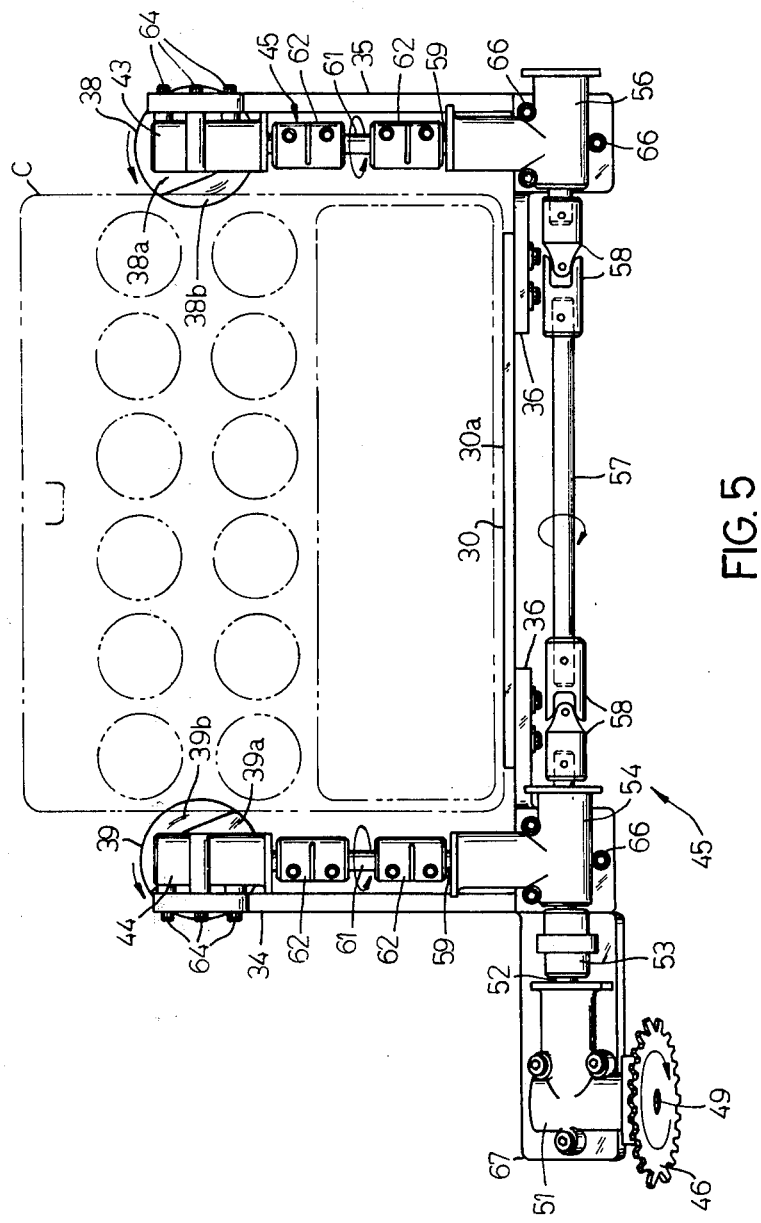
FIG. 5 is a view taken along the line 5—5 in FIG. 2.

The shafts 41 and 42 which support the feed screws 38 and 39 are each supported at their upper ends by gear boxes 43 and 44, respectively, which are in turn operably connected to a feed screw drive assembly 45. The feed screw drive assembly 45 is generally comprised of a drive sprocket 46 connected by means of a drive chain 47 to a conveyor assembly power output sprockets 48 of the conveyor assembly 10 as shown in FIG. 2. Referring to FIG. 5, the drive sprocket 46 is shown as being connected by means of a shaft 49 to a gear case 51. The gear case 51 is in turn connected by means of an output shaft 52 and by a coupling 53 to a gear box 54. The gear box 54 is connected to a smiliar gear box 56 by means of a connecting drive shaft 57 and a pair of universal joints 58 connecting opposite ends of the drive shaft 57 to the gear boxes 54 and 56. Each of the gear boxes 54 and 56 in turn include an output shaft 59 connected by means of a central drive shaft 61 and by pairs of couplings 62 to the gear boxes 43 and 44, respectively. It is shown in FIG. 5 that the gear boxes 43 and 44 are each bolted to the outwardly extending end of the angular feed screw supporting brackets 34 and 35. As shown in FIG. 2, each of the outwardly extending ends of the feed screw supporting brackets 34 and 35 include longitudinally extending slots 63 for slideably receiving bolts 64 used to support the gear boxes 43 and 44. The gear boxes 43 and 44 are thus adjustably mounted on the end of the angular feed screw supporting brackets 34 and 35. It should also be noted that the couplings 62 are functional to accommodate such adjustment of the gear boxes 43 and 44. The gear boxes 54 and 56 are also secured to the respective angular feed screw supporting brackets 34 and 35 by means of a plurality of bolts 66. The angular feed screw supporting brackets 34 also includes a laterally extending projection 67 to provide means for rigidly supporting the gear case 51 and the drive sprocket 46.

Figure 4:
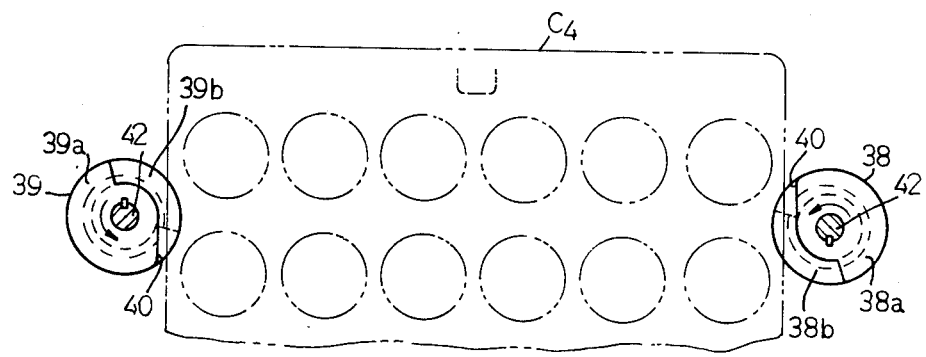
FIG. 4 is a partial view taken along the line 4—4 in FIG. 3.

In operation, the carton denester receives a stack of pulp egg cartons S in the manner shown in FIGS. 2, 4, and 5, one side of the stack of cartons S being received in sliding relationship against the supporting surface 30a of the relief plate 30 and the bottom carton C' of the stack of cartons being supported at its opposite sides by the feed screws 38 and 39. The cartons C are each comprised of a base portion $C_1$ and a lid portion $C_2$ joined by an integral hinge, and also include a peripheral flange $C_4$ which extends around the periphery of the carton. When the stack of cartons S is received in the carton denester, the flanges $C_4$ adjacent the lid portions $C_2$ are received against the relief plate supporting surface 30a and the sides of the base portion $C_1$ of the bottom carton C' are supported by the spaced feed screws 38 and 39. Since the relief plate 30 is inclined at an angle of approximately 25° from a vertical position, the supporting surface 30a of the relief plate functions to support a substantial portion of the weight of the stack of cartons S placed in the carton denester. The remainder of the weight of the stack of cartons is supported by the feed screws 38 and 39.

Figure 6:
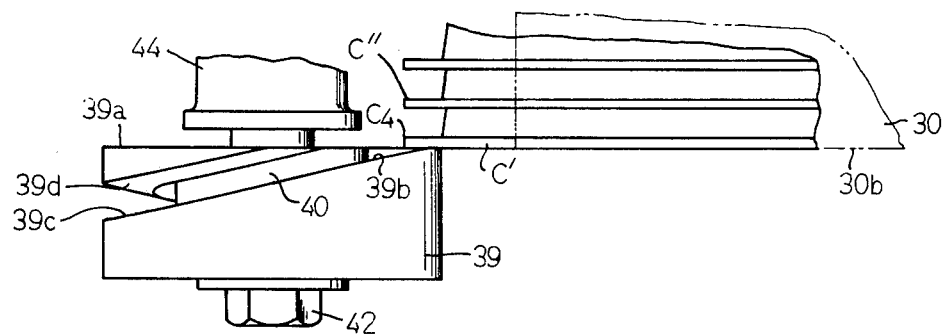
FIG. 6 is an enlarged view of one of the feed screws shown in FIG. 3 but shown in a position wherein the upper surface of the feed screw supports the stack of cartons with the bottom carton supported by the relief plate.
Figure 7:
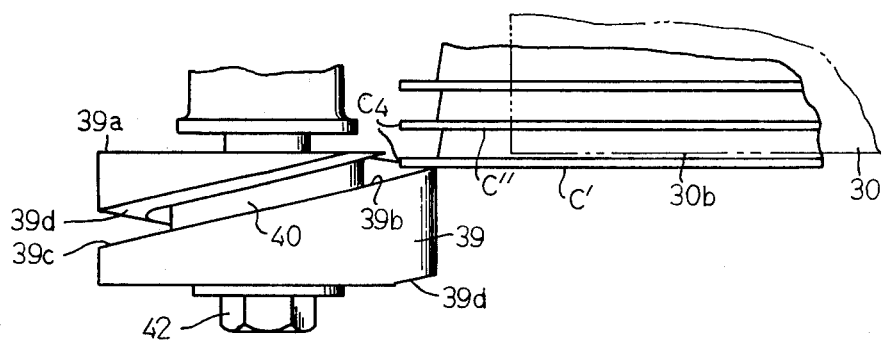
FIG. 7 is a view similar to FIG. 6 but showing the feed screws supporting the stack of cartons with the bottom carton positioned below the lower edge of the relief plate.

The manner in which the cartons C are separated during the denesting operation is best shown with reference to FIG. 2 and FIGS. 6-8. Referring to FIG. 6, as the cartons move downwardly during the denesting process, the peripheral flange $C_4$ of the bottom carton C' is received against and supported by the flat upper surfaces 38a and 39a of the feed screws 38 and 39, respectively. The lower edge 30b of the relief plate 30 and the flat upper surfaces 38a and 39a are shown in FIGS.

Figure 8:
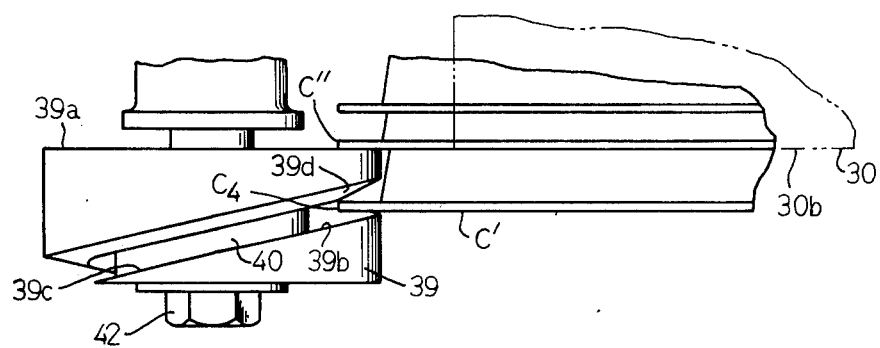
FIG. 8 is a view similar to FIGS. 6 and 7 but showing the feed screw pulling the bottom carton downwardly away from the remainder of the stack of cartons and supporting the remainder of the stack of cartons on its upper surface.

2 and 6 as lying in a plane which is substantially perpendicular to the plate 30. Thus, the flange C₄ of the carton C' supported by flat upper surfaces 38a and 39a of the feed screws is received against and is supported by the lower edge 30b of the relief plate 30. As the feed screws rotate, the flange C₄ is then supported on the inclined upper surfaces 38b and 39b which comprise the upper sides or surfaces of the helical threads 38c and 39c (FIG. 7), and the flange C₄ moves downwardly under the weight of the stack with respect to the direction of movement of the stack of cartons and past the bottom edge 30b of the relief plate. At this point, the weight of the stack of cartons S, except for the bottom carton C', is supported in part by the relief plate. The bottom carton C' is supported only by the feed screws. As a result, as the carton C' moves past the end 30b of the relief plate, the variances in the forces on the bottom carton C' and the adjacent carton C'' above it tend to cause the carton C' to snap free of the carton C'' above it such that it is no longer firmly secured within the carton immediately above it. Then, as the feed screws 38 and 39 continue to rotate, as shown in FIG. 8, the flange C₄ of the bottom carton C' is received within the helical grooves 40 defined by helical threads 38c and 39c and forced downwardly by the lower surfaces 38d and 39d of the threads 38c and 39c causing separation of the bottom carton from the carton above it. The bottom carton is then permitted to drop face downward onto the conveyor. As also shown in FIG. 8, while the bottom carton C' is being stripped from the adjacent carton C'' above it, the peripheral flange C₄ of carton C'' is supported on the flat surfaces 38a and 39a of the feed screws.

In order to provide additional means for causing separation of the cartons before they are pulled apart by the feed screws, the feed screws 38 and 39 are driven in the same direction. The frictional forces of the feed screws 38 and 39 upon the sides of the carton C' are thus opposite forces tending to twist the bottom carton C'. Furthermore, the feed screw 38 is shown in FIG. 5 as rotating in a counterclockwise direction such that frictional force between the feed screw 38 and the carton causes the stack of cartons to be forced toward the relief plate 30. Since the bottom carton C', however, drops below the lower edge 30b of the relief plate, different forces act on the bottom carton C' compared to the adjacent carton C''. This has the effect of tending to distort the bottom carton C' as it drops below the bottom edge 30b of the relief plate thereby further facilitating separation of the cartons.

RESUME

Due to the rough surfaces of pulp egg cartons along with their other characteristics, it is unusually difficult to separate them. Merely using a plurality of feed screws to pull the cartons apart has been found to be insufficient to consistently separate the cartons and frequently causes damage to the cartons. The present invention on the other hand provides a means for first causing the bottom carton to snap free of the adjacent carton above it thus permitting the feed screws to easily pull the carton downwardly away from the stack of cartons.

The arrangement of the relief plate 30, i.e., positioning the relief plate at an inclined angle of 25° from the vertical such that the relief plate supports a substantial portion of the weight of the stack of cartons, and positioning the feed screws such that the bottom carton is received in the grooves of the feed screws only after it has moved past the lower end of the relief plate, has the inherent effect of causing the bottom carton to be released from the adjacent carton above it providing a more efficient means of causing separation of the bottom carton from the stack of cartons. Furthermore, by causing the feed screws to rotate in the same direction, the bottom carton is subjected to different forces than the carton above it, further facilitating release of the bottom carton and separation of the cartons.

I claim:

1. A carton denester for supporting a stack of nested cartons and for separating the cartons one at a time from the bottom of said stack, and wherein each of the cartons includes a lateral flange, the carton denester comprising:
   support means for supporting a stack of cartons, said support means being inclined to the vertical for at least partially supporting the weight of the stack of cartons thereon, the stack of cartons being downwardly movable along the support means as the cartons are separated from the bottom of the stack and said support means including a lower edge;
   rotatable feed screw means for separating the bottom carton from said stack of cartons, and being supported generally below said stack of cartons with respect to the direction of movement of said cartons along said support means, said screw means having an upper surface coplanar with said lower edge of said support means for partially supporting the said stack of cartons, said screw means also having a helical groove intersecting said upper surface for receiving the flange of the bottom carton of the stack when the flange of the bottom carton has moved below said lower edge, to thereby separate the bottom carton from the stack when the feed screw means rotate; and
   means for rotating the feed screw means.

2. The carton denester set forth in claim 1 wherein said support means comprises a relief plate disposed substantially 25° from a vertical position, and wherein said feed screw means includes a pair of spaced apart feed screws, each of said screws including an upper surface substantially coplanar with said lower edge of said support means, and whereby cartons are supported on said upper surface and by the support means.

3. The carton denester set forth in claim 1 wherein said feed screws means includes a pair of spaced apart feed screws having upper surfaces coplanar with said lower edge of said support means for partially supporting opposite sides of said cartons, and wherein said means for rotating said feed screws cause said pair of feed screws to rotate in the same direction whereby said feed screws twist said bottom carton supported by said feed screws.

4. A carton denester for supporting a stack of nested cartons and for separating the cartons one at a time from the bottom of said stack, and wherein each of the cartons includes a lateral flange, the carton denester comprising:
   a relief plate inclined to the vertical for supporting a stack of cartons thereon in inclined relationship and for at least partially supporting the weight of the stack of cartons thereon, the stack of cartons being downwardly movable along the relief plate as the cartons are separated from the bottom of the stack and said relief plate terminating in a lower edge;

a feed screw assembly for separating the bottom carton from said stack of cartons, said feed screw assembly being secured near said lower end of and extending outwardly from said relief plate, said feed screw assembly including a pair of spaced apart rotatable feed screws located beneath opposite sides of said stack of cartons for partially supporting said stack of cartons, each of said screws including a helical groove, said screws having an upper side coplanar with said lower edge of said relief plate, and said flange of the bottom carton of the stack of cartons being engageable with said groove when said flange of the bottom carton has moved below the lower edge of said plate and is received in said groove whereby rotation of the feed screws separates the bottom carton from the stack of cartons; and means for rotating the feed screws.

5. A container handling apparatus comprising:

a printing means for applying ink to outer surfaces of successive flanged containers;

conveying means operably connected to said printing means and for conveying successive containers to said printing means; and a container denester supported above said conveying means for supporting a stack of nested containers and for separating the containers one at a time from the bottom of the stack and successively feeding the containers to the conveying means in an opened downwardly facing position, the outside surface of the container facing upwardly, the container denester including a support means for supporting a stack of containers, said support means being inclined to the vertical for at least partially supporting the weight of the stack of containers thereon and said support means including a lower edge, the stack of containers being downwardly movable along the support means as the containers are separated from the bottom of the stack, feed screw means for separating the bottom carton from said stack of containers and being supported generally below said stack of containers with respect to the direction of movement of said containers along said support means, said screw means having an upper surface coplanar with said lower edge of said support means for partially supporting said stack of containers, said screw means also having a groove intersecting said upper surface for receiving the flange of the bottom container of the stack when the flange of the bottom container has moved below said lower edge, to thereby separate the bottom container from the stack when the feed screw means rotate, and means for rotating the feed screw means, whereby said containers drop from said denester successively onto said conveyor and with said outside surface of said containers facing upwardly for subsequent printing thereon by said printing means as the containers are delivered to said printing means by said conveyor.

6. A method of denesting cartons one at a time from a stack of nested cartons by successively separating the bottom carton from said stack, the method comprising the steps of:

supporting said stack in an inclined position and against a support plate so that the weight of said stack is supported at least partially by said plate;

supporting said stack upon rotatable feed screw means so that the weight of said stack is supported at least partially by said feed screw means and for downwardly sliding movement along said plate, said feed screw means having an upper surface coplanar with the lower edge of said plate; and then engaging the bottom carton of said stack by said rotatable feed screw means and pulling it downwardly thereby lowering the bottom carton downwardly past said lower edge of said support plate so that the bottom carton is unsupported by said plate whereby the bottom carton is partially released from the adjacent carton above it whereby the carton is separated from the adjacent carton directly thereabove.

7. The method set forth in claim 6 further including, applying twisting forces to opposite sides of the bottom carton by said rotatable feed screw means as the bottom carton is lowered past the lower edge of the plate.

* * * * *